C. H. MILLER.
LEMON-SQUEEZER.

No. 171,154.                     Patented Dec. 14, 1875.

Witnesses:
Edward Wilhelm
Chas. J. Buchheit

Charles H. Miller, Inventor
By Jay Hyatt, Atty

UNITED STATES PATENT OFFICE

CHARLES H. MILLER, OF BUFFALO, NEW YORK.

IMPROVEMENT IN LEMON-SQUEEZERS.

Specification forming part of Letters Patent No. 171,154, dated December 14, 1875; application filed November 15, 1875.

*To all whom it may concern:*

Be it known that I, CHARLES H. MILLER, of the city of Buffalo, in the county of Erie and State of New York, have invented certain new and useful Improvements in Lemon-Squeezers, which improvements are fully set forth in the following specification, reference being had to the accompanying drawing.

My invention relates to that class of lemon-squeezers which consists of two levers hinged together, one being provided with a cup or concave enlargement, in which the lemon is placed, while the other lever has a corresponding curved plate, which, in closing the levers, presses the lemon into the cup, thereby expelling the juice therefrom.

My invention consists in constructing the cup and curved pressure-plate each with one or more corresponding slots, forming an escape for the juice, and permitting a knife to be passed through, so as to cut or divide the pressed lemon into two or more parts; also, in providing the cup with one or more projecting spurs or teats, which enter the rind of the lemon, and retain the same against displacement while being pressed or sliced.

Figure 1:
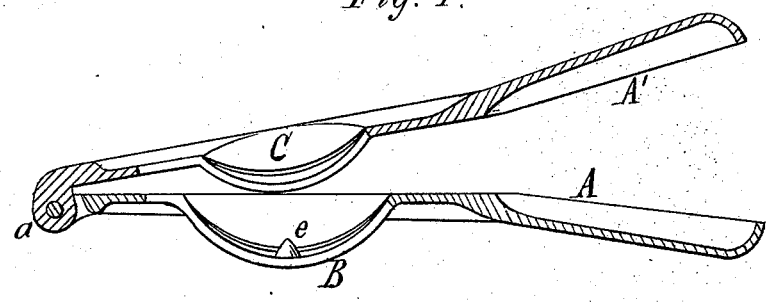
Figure 2:
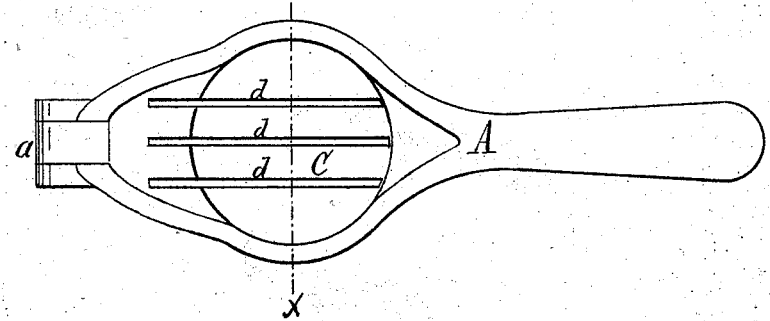
Figure 3:
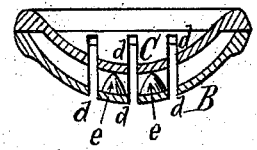

In the accompanying drawing, Figure 1 is a longitudinal section of my improved lemon-squeezer. Fig. 2 is a plan view thereof. Fig. 3 is a cross-section in line $x\,x$, Fig. 2.

Like letters of reference refer to like parts in each of the figures.

A A' represent the two handles of the instrument, pivoted together at $a$. B is the cup-shaped or concave enlargement, formed with the handle A, so as to present its concave side to the handle A'. C is a similar enlargement, formed with the handle A', presenting its convex side to the handle A, and fitting, when the handles are closed, more or less tightly into the cavity of the cup B. The latter and the curved plate C are preferably so proportioned as to leave, when the handles are closed between both, a narrow open space of sufficient size to receive the compressed lemon. $d$ represents one or more slots, formed in both the cup B and curved plate C, so as to coincide when the handles are closed. By passing a knife through the slot or slots the compressed lemon is readily divided into several parts. The slot or slots $d$ also permit the escape of the juice from the cup. The slot or slots $d$ are preferably arranged longitudinally, and extend on one side beyond the cup, as clearly shown in the drawing, to a distance to which the circumference of the compressed lemon will not reach, so as to permit the knife to be passed clear through both coinciding slots without coming in contact with the lemon, thereby avoiding the necessity of piercing the lemon in order to introduce the knife. $e$ represents one or more projecting teats or spurs, formed on the inner surface of the cup B, for the purpose of entering the rind of the lemon as the handles are closed, thereby preventing the lemon from slipping in the shallow cup while being compressed, or afterward during the operation of slicing.

My improved implement is very simple and convenient, the slots thereof permitting a free escape of the lemon-juice, and enabling at the same time the pressed lemon to be sliced with great ease and dispatch.

I claim as my invention—

1. The combination, with the handles A A', of the cup B and curved plate C, each provided with one or more coinciding slots, $d$, substantially as and for the purpose hereinbefore set forth.

2. The combination, with the handles A A', cup B, and pressure-plate C, of one or more teats or spurs, $e$, formed on the inner surface of the cup, substantially as and for the purpose hereinbefore set forth.

CHARLES H. MILLER.

Witnesses:
EDWARD WILHELM,
CHAS. J. BUCHHEIT.